April 7, 1936.     P. QUICHON     2,036,436
DEVICE FOR ROUGH TURNING IN THE LATHE OR SIMILAR MACHINE TOOL
Filed April 4, 1935     3 Sheets-Sheet 3

P. Quichon, Inventor
By Glascock Downing & Seebold, Attys.

Patented Apr. 7, 1936

2,036,436

UNITED STATES PATENT OFFICE 2,036,436

DEVICE FOR ROUGH TURNING IN THE LATHE OR SIMILAR MACHINE TOOL

Paul Quichon, Montlucon, France, assignor to Societe Anonyme Compagnie des Forges de Chatillon, Commentry & Neuves-Maisons, Paris, France Application April 4, 1935, Serial No. 14,687
In France April 11, 1934

2 Claims. (Cl. 82—14)

In my Letters Patent No. 1,976,459, I have described a device for roughing out parts or members of any type whatever, having an arbitrary cross section variable according to the length of the part or member, this device allowing, without having to center the work in the lathe, to very regularly remove a infinitely small quantity of cuttings without materially distorting the unwrought member.

This device is mainly characterized by the position of the tool immediately adjacent to the guide roller, which bears upon the unwrought portion of the work, in such a manner that the point of the tool should be placed in the plane passing through the axis of the work and the axis of the roller, the unit thus constituted by the tool and guide roller allowing to very rapidly effect, at low cost, the roughing out of any unwrought parts or members in excellent conditions of efficiency and with a perfection which has never been reached with actually existing apparatus, even those of most improved design.

I have found that the accuracy of the roughing out operation is further increased particularly by eliminating the error at the sharp angles of the members to be operated upon, by substituting for the single tool a set of tools arranged in fan-like fashion in front of the work to be roughened out, in this case, provisions are of course made in order that the plane passing through the axis of the theoretical milling cutter formed by the points of these tools and the axis of the milled wheel or the portion of the abutment bearing on the work should approximately contain the axis of rotation of the work.

Two forms of construction of the device according to the invention are illustrated in the accompanying drawings, in which:

Fig. 1 shows the general arrangement of the lathe on which is to be fitted up the device according to the invention.

Figure 1:
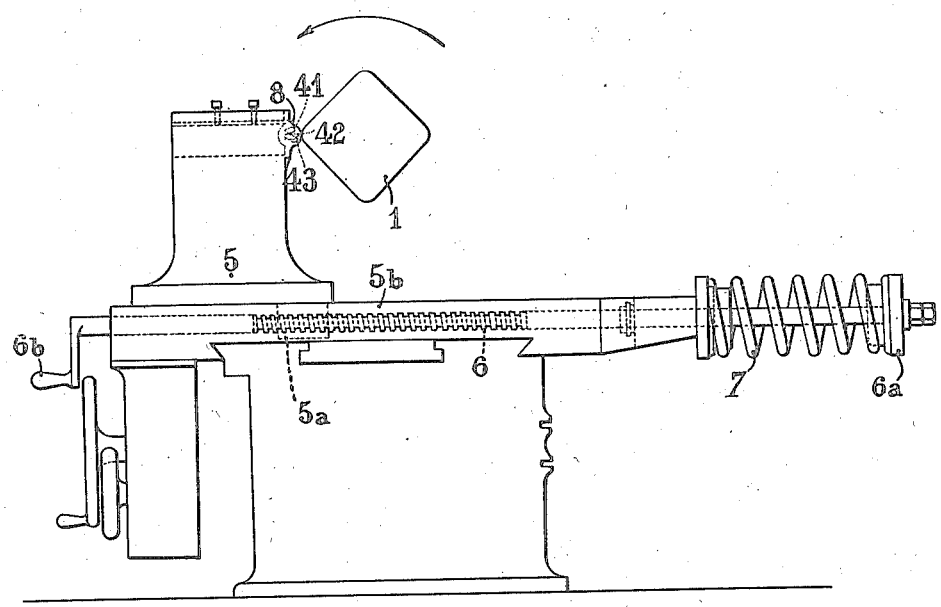
Fig. 1 is a side elevation showing the mode of fitting up the device on a lathe.

I designates the ingot to be roughened out.

This ingot is fitted up on a lathe or on any other machine capable of effecting the work which will be described hereinafter.

The rough turning operation is effected by means of a set of tools 41, 42, 43, mounted on a support 5 freely resting on a slide rest 5b so as to be capable of moving at right angles to the axis of the ingot.

At the lower part, the slide rest 5b carries a nut 5a in which is screwed a screw threaded rod 6 at right angles to the axis of rotation of the work 1; on one end of this screw threaded rod is fitted a compression spring 7, inserted between the edge of the slide rest 5b and a bearing washer 6a, rigid with the end of said rod 6.

The latter, which is so mounted as to be freely movable in the axial direction, is thus urged from left to right on the drawing, by the tension of spring 7, and drives in this movement the support 5, so that the tools 41, 42, 43 are constantly held in contact with the surface of the ingot 1. The tension of the spring 7 can be adjusted by causing the screw threaded rod 6 to rotate by means of a crank 6b.

On the other hand, on the support is arranged a roller 44, placed beside the tools, preferably as near as possible to the latter and in front of the same.

Figure 2:
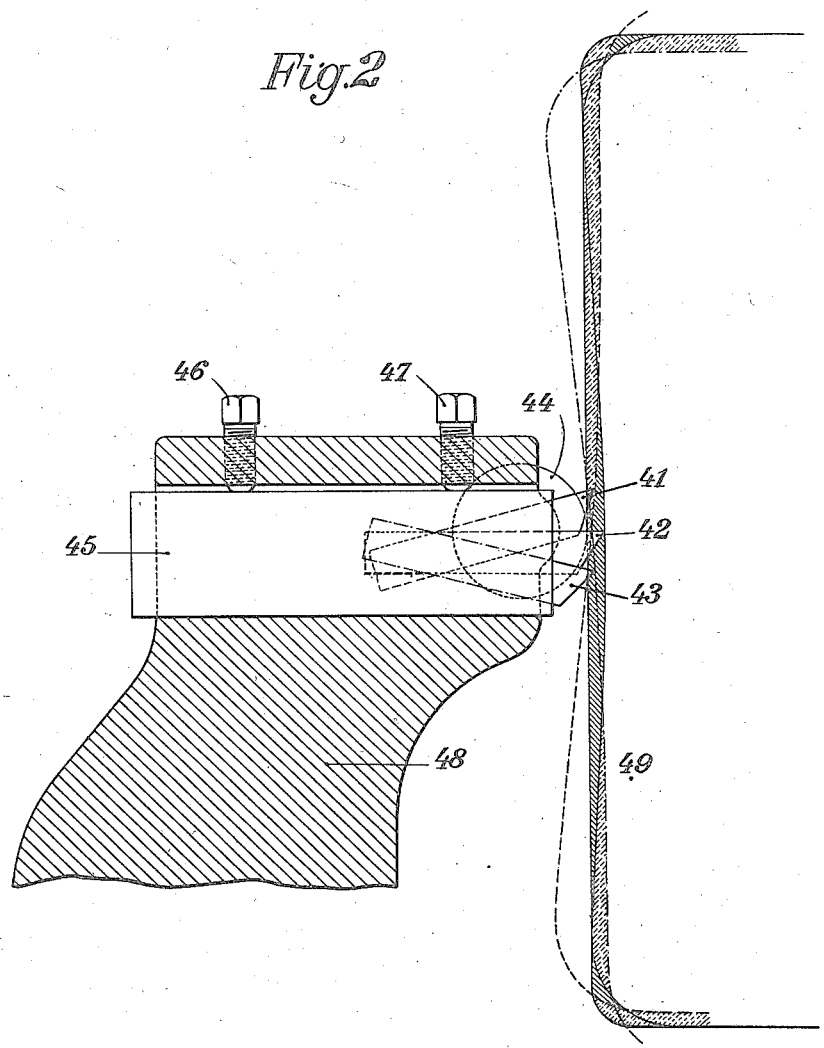
Fig. 2 is a longitudinal section showing the arrangement of the tools and the mode of operation of a first embodiment.

Fig. 2 shows, on an enlarged scale, the details of the arrangement of tools 41, 42, 43 and their mode of operation.

These tools, three in number in the embodiment illustrated, are longitudinally arranged along each other, with different inclinations in the transverse direction. They are secured in one and the same tool-holder 45 arranged immediately beside the roller 44. The tools are locked in the tool-holder 45 by means of screws 46 and 47. In this case, 49 designates the work, which is assumed to have a square cross section.

The first tool 41 is inclined with its cutting edge downwardly. It enters in operation when the work occupies the position shown in dotted lines.

The second tool 42 is placed substantially horizontally. Its cutting edges is constantly in contact with the surface of the work 49.

The third tool 43 is inclined with its cutting edge upwardly and enters in operation when the work occupies the position indicated in dot and dash lines.

Figure 3:
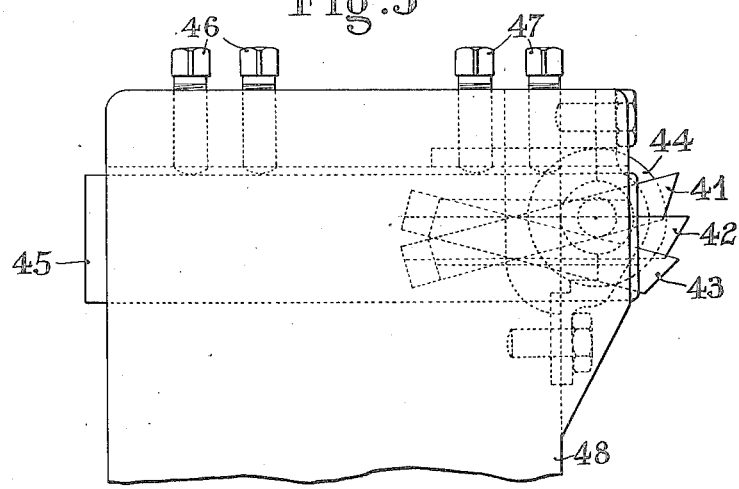
Figs. 3 and 4 are respectively a side elevation and a plan view showing a support adapted to receive two groups of tools arranged in fanlike fashion.
Figure 4:
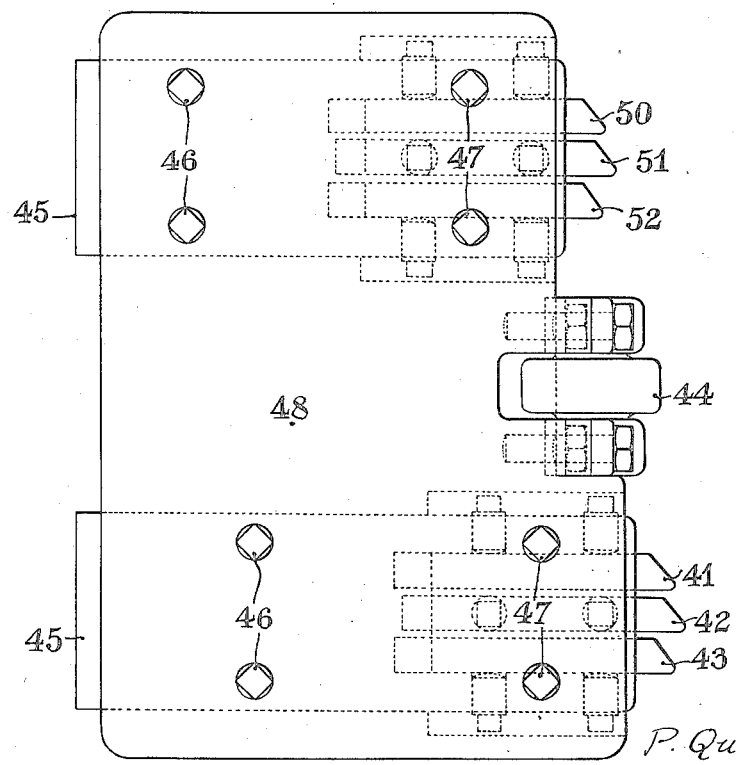

Figs. 3 and 4 show the arrangement of the roller 44 in combination with two sets of tools 41, 42, 43 and 50, 51, 52, the latter set of tools being arranged before the roller in the direction of feed, and the first set of tools being placed behind said roller, each of these sets of tools operating as already explained.

This system allows of roughing out members having a square cross section with plane faces and sharp angles or having small radii, and this roughing out operation is so much the more perfect as a larger number of tools is used, provided the plane passing through the axis of the theoretical milling cutter formed by the cutting edges and the axis of the milled wheel or the point of contact of the guide abutment on the work passes very near the axis of rotation of the latter.

I claim:

1. A device for rough turning in the lathe or similar machine-tool unwrought members of any kind whatever, comprising a support slidably and transversely mounted relatively to the axis of the work, a tool-holder on this support and adapted to receive a cutting tool, means for holding this tool constantly in contact with the surface of the part to be roughened out and a member on said support adapted to slide on the surface of said work and for limiting the depth of cut, this guide member being constituted by a hardened abutment secured adjacent to the tool in the tool-holder, and the cutting device being constituted by a set of tools superposed in fan-like fashion.

2. A device for rough turning in the lathe or similar machine-tool unwrought members of any kind whatever, comprising a support slidably and transversely mounted relatively to the axis of the work, a tool-holder on this support and adapted to receive a cutting tool, means for holding this tool constantly in contact with the surface of the part to be roughened out and a guide member on said support, adapted to slide on the surface of said work and for limiting the depth of cut, the cutting device being constituted by a set of tools superposed in fan-like fashion, and the guide member and the tool being so fitted up that the plane passing through the cutting edge of the tool and the point of contact of the guide-member on the part to be roughened out approximately passes through the centres of the lathe.

PAUL QUICHON.